(12) United States Patent
Stumm et al.

(10) Patent No.: US 7,197,128 B1
(45) Date of Patent: Mar. 27, 2007

(54) TELECOMMUNICATION ARCHITECTURE

(75) Inventors: Michael Stumm, Toronto (CA); William M. Snelgrove, Toronto (CA); Bruno R. Preisa, Waterloo (CA); Mark J. Frazer, Toronto (CA); Mauricio De Simone, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 299 days.

(21) Appl. No.: 09/722,500

(22) Filed: Nov. 28, 2000

(30) Foreign Application Priority Data

Oct. 19, 2000 (CA) .................................... 2323900

(51) Int. Cl.
*H04M 3/42* (2006.01)

(52) U.S. Cl. .................... 379/211.02; 379/199; 379/200

(58) Field of Classification Search ................. 379/199, 379/200, 211.02
See application file for complete search history.

(56) References Cited

U.S. PATENT DOCUMENTS

| | | | | |
|---|---|---|---|---|
| 4,277,649 A | * | 7/1981 | Sheinbein | 379/211.02 |
| 5,206,899 A | * | 4/1993 | Gupta et al. | 379/120 |
| 5,329,578 A | | 7/1994 | Brennan et al. | 379/211.03 |
| 5,440,620 A | | 8/1995 | Slusky | 379/100.07 |
| 5,592,541 A | | 1/1997 | Fleischer, III et al. | 379/211.02 |
| 5,819,177 A | | 10/1998 | Vucetic et al. | 455/425 |
| 6,125,126 A | | 9/2000 | Hallenstaal | 370/522 |
| 6,130,938 A | | 10/2000 | Erb | 379/211.02 |
| 6,577,726 B1 | * | 6/2003 | Huang et al. | 379/265.02 |

FOREIGN PATENT DOCUMENTS

| | | |
|---|---|---|
| WO | WO 99 14919 | 3/1999 |
| WO | WO 00 41406 | 7/2000 |
| WO | WO 00 67494 | 11/2000 |

\* cited by examiner

*Primary Examiner*—Quynh H. Nguyen
(74) *Attorney, Agent, or Firm*—Katten Muchin Rosenman, LLP

(57) ABSTRACT

The present invention provides a novel telecommunication architecture. The architecture includes a subscriber agent for each subscriber within a telecommunication network. The subscriber agent includes the subscriber's telephone number and calling features. The network also includes terminal agents which are directly associated with one or more terminals such as telephones. The subscriber agent can be associated with one or more terminal agents within the network, so that the subscriber's telephone number and set of calling features can be carried to any terminal within the network. A wide variety of calling features and terminals are supported by the architecture.

58 Claims, 9 Drawing Sheets

TELECOMMUNICATION ARCHITECTURE

FIELD OF THE INVENTION

The present invention relates to a system, apparatus and method of providing enhanced features in a telecommunications system. More specifically, the present invention relates to a telecommunication architecture that is associates subscribers with different telecommunication terminals.

BACKGROUND OF THE INVENTION

The Public Switched Telephone Network (PSTN) has undergone tremendous advancement since its inception. Fibre-optic cables and satellites can simultaneously carry an enormous number of telephone calls. The Signaling System #7 (SS7) protocol and the Advanced Intelligence Network (AIN) provide support for a number of enhanced calling features such as call forwarding, voice mail and the like. Notwithstanding these advancements, at its essence the PSTN still establishes a telephone call between subscribers by completing a connection between subscriber's telephone lines, which, as a circuit-switched network, makes the current PSTN notionally identical to the way calls were completed when the PSTN was first conceived. Inherent in the PSTN architecture is the paradigm that each subscriber is uniquely associated with a physical telephone line. Thus, a subscriber's telephone number and the calling features preferred by the subscriber are also uniquely associated with the same physical telephone line, which can constrain the creation of additional enriched features that would be otherwise supported by modern technology.

For example, the unique association between a subscriber and a telephone line creates problems when implementing local-number portability, although SS7 does offer certain ways to implement local-number portability within the existing PSTN. Furthermore, calling features, such as caller-id and call-waiting, can only be accessed at the subscriber's phone line—thus if the subscriber is using another telephone line the subscriber may not have access to these features.

Another limitation with the PSTN structure relates to typical implementations of the call-forwarding feature. Due to the unique association between one subscriber and one telephone line, when a first subscriber forwards his telephone line to a second subscriber's telephone line, a caller for the first subscriber may be confused when the second subscriber answers. In any event, while the first subscriber's phone is forwarded, the caller will not be able to leave a message on the first subscriber's voicemail, nor will anyone using the first subscriber's telephone be able to receive an incoming telephone call, as all such calls will forward to the second subscriber's telephone.

More flexibility in network architectures can be found outside the PSTN. For example, in WO-9925071-A2, a data network architecture is taught that allows users to access data from the network via different types of client devices (e.g. computer terminals, cell-phones, or personal digital assistants) that are connected in a distributed manner to the network. WO-9925071-A2 teaches a database in the network which stores client device capabilities, and a second database in the network that contains user profiles. When a user accesses a particular client, the network first determines the capability of the client, and then determines the services to which the user subscribes, granting access to the user based on the subscribed services making appropriate format conversions in data to allow presentation of accessed data on the client device. However, WO-9925071-A2 is limited to non-real time services such as the accessing of email or web-browsing. While WO-9925071-A2 does contemplate some types of voice services (i.e. the retrieval of voicemail or text-to-speech conversions of email), WO-9925071-A2 does not teach a network that manages end-to-end real-time applications, such as voice telephone calls, such that WO-9925071-A2 does not present a viable alternative to the PSTN.

Overall, it can be seen that the existing network architecture constrains the elegant implementation of certain enriched features, and it desirable to provide a novel structure that readily supports such features.

SUMMARY OF THE INVENTION

It is an object of the present invention to provide a novel telecommunication architecture that obviates or mitigates at least one of the above-identified disadvantages of the prior art.

In an aspect of the invention, there is provided a telecommunication architecture comprising a network for carrying communications between subscribers and at least one terminal agent executing on the network that interfaces the network with a terminal. The architecture also includes at least one subscriber agent executing on the network that belongs to one of the subscribers. The subscriber agent has at least one terminal identifier. Each terminal identifier is for pointing to a respective terminal agent, such that the one of the subscribers can establish a communication over the network from a terminal respective to the one of the terminal agents.

In another aspect of the invention, there is provided a switch comprising at least one subscriber line interface for connection to a respective terminal; a network interface for connection to a network; a processing unit interconnecting the subscriber line interface and the network, the processing unit being operable to execute a subscriber agent associated with a subscriber and a terminal agent respective to each terminal; the subscriber agent for identifying the subscriber to the network and being configurable to point to the terminal agent in order to carry communication between the network and the terminal agent; and, the terminal agent for managing, via the subscriber line interface, communications between the terminal and the processing unit according to the terminal's capabilities such that a subscriber using the terminal can conduct a communication over the network.

In another aspect of the invention, there is provided a method for setting up an incoming call to a subscriber comprising the steps of:

receiving a request to establish the call with the subscriber;

obtaining a profile of the subscriber;

selecting a terminal appropriate to the call according to criteria stored in the profile; and connecting the call to the terminal.

In another aspect of the invention, there is provided a method of associating a subscriber with a terminal comprising the steps of:

receiving a request from a subscriber to be associated with a terminal;

obtaining a profile of a subscriber who submitted the request; and, updating the profile to indicate that calls for the subscriber are to be directed to the terminal.

In a particular aspect of either of the foregoing methods, there is an additional step of:

providing calling features for the subscriber at the terminal in accordance with calling features listed in the profile.

In another aspect of the invention, there is provided a method for setting up an outgoing call comprising the steps of:
receiving a request to establish a call from a terminal;
obtaining a profile of a subscriber who submitted the request; and
connecting the call in accordance with criteria listed in the profile.

In a particular aspect of either of the foregoing methods, the profile is a subscriber agent.

In a particular aspect of either of the foregoing methods, the selecting step includes selecting a terminal agent that manages communications with the terminal and the connecting step includes pointing the subscriber agent to the terminal agent and establishing the connection according to the pointer.

In a particular aspect of either of the foregoing methods, the terminal agent is further operable to manage the communication in accordance with the capabilities of the terminal.

In another aspect of the invention there is provided a software structure executable on a switch having a processing unit that interconnects a network and at least one terminal, comprising: at least one terminal agent that manages communications with a respective one of the terminals according to its capabilities; and, a subscriber agent associated with a subscriber, the subscriber agent being configurable to point to one of the terminal agents and operable, when executing on the switch, so that the subscriber can establish a communication over the network from a terminal respective to the terminal agent.

The present invention provides a novel telecommunication architecture. The architecture includes a subscriber agent for each subscriber within a telecommunication network. The subscriber agent includes the subscriber's telephone number and calling features. The network also includes terminal agents which are directly associated with one or more terminals such as telephones. The subscriber agent can be associated with one or more terminal agents within the network, so that the subscriber's telephone number and set of calling features can be carried to any terminal within the network. A wide variety of calling features and terminals are supported by the architecture.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
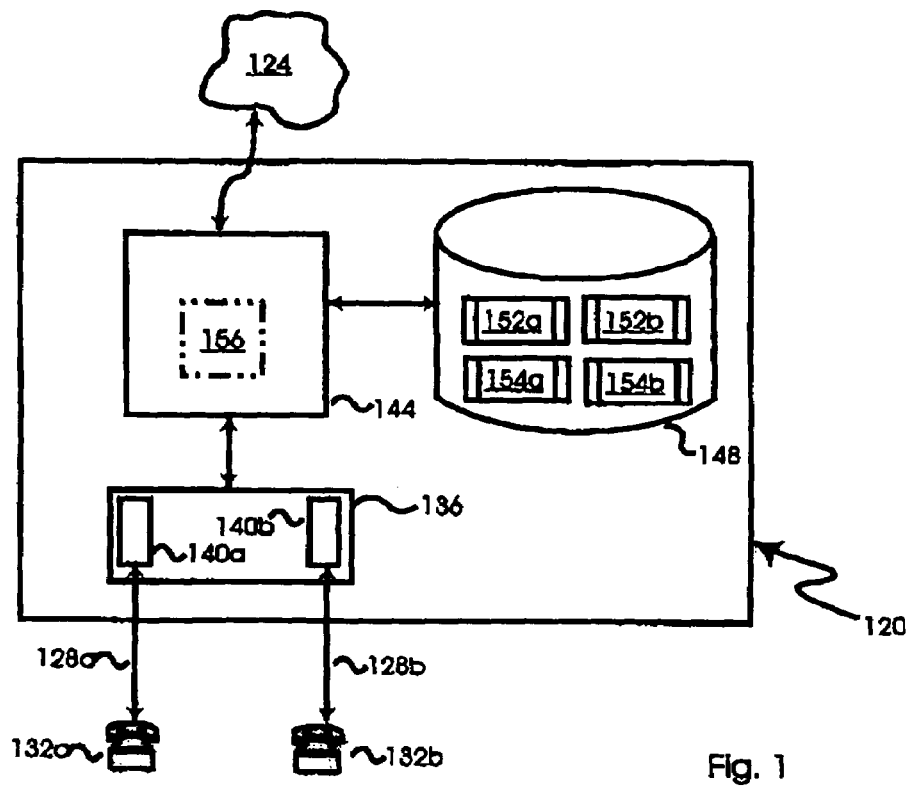
FIG. 1 is a schematic representation of a hardware structure of a switch in accordance with an embodiment of the invention.

A telecommunication architecture in accordance with an embodiment of the invention will now be discussed. Referring now to FIG. 1, a switch 120 interconnects a communication network 124 and a pair of telephone lines 128.

Communication network 124 can be the PSTN, a packet switched data network or a combination thereof. Accordingly, while switch 120 is not based on the SS7 protocols, appropriate PSTN gateway can be used between switch 120 and the PSTN in order to make switch 120 appear as if it were an SS7 switch to the remainder of the PSTN and thus operable to carry voice telecommunications over the PSTN.

In a present embodiment, telephone lines 128 are a traditional set of twisted-pair of copper wires now commonly used for POTS telephone lines, which in turn connect a pair of terminals 132, (which in a present embodiment are POTS telephones) to switch 120. Telephone lines 128 each connect to subscriber-line interfaces 140, which are mounted within a line-card rack 136 integral with switch 120.

(In other embodiments of the invention, telephone lines 128 can be any type of link that connects to a corresponding type of terminal 132. For example, lines 128 can be a wireless link, based on CDMA, OFDM, TDMA or the like, and terminals 132 can be mobile, fixed or nomadic wireless telephones with appropriate transceivers to communicate over lines 128. In a wireless system, subscriber-line interfaces 140 would thus be wireless transceivers within switch 120, and notionally, switch 120 would be a wireless base station. Other types of links that could be used instead of lines 128 will occur to those of skill in the art.)

Switch 120 also includes a controller 144 for switching traffic between network 124 and lines 128. Switch 120 also includes a storage device 148 that stores information used by controller 144 to connect calls between network 124 and lines 128. More specifically, storage device 148 stores two terminal agents 152a and 152b, and storage device 148 also stores two subscriber agents 154a and 154b.

Terminal agents 152a and 152b are each uniquely associated with their respective telephone lines 128 and 128b. Each terminal agent 152 thus contains a line-identifier that uniquely associates the terminal agent 152 with its respective telephone subscriber-line interface 140. Typically, terminal agents 152 also include information about the type, characteristics and functionality of its respective terminal 132. For example, since terminals 132*a* and 132*b* are POTS telephones, then terminal agents 152 will maintain information about these POTS telephones, such as the fact that the POTS telephones are only capable of voice telephone calls and that they do not include graphical user displays, and are therefore unable to receive caller-id information.

Subscriber agents 154*a* and 154*b*, however, are not uniquely associated with any telephone line 128. Instead, subscriber agents 154*a* and 154*b* are uniquely associated with a subscriber, and thus each subscriber agent 154 typically includes the subscriber's telephone number and a list of calling features to which the subscriber subscribes. Subscriber agents 154 also include a terminal-identifier that associates the subscriber agent 154 with one (or more) of the terminal agents 152. As will be explained in greater detail below, the terminal-identifier can be changed according to the subscriber's wishes.

While storage device 148 is shown to be physically located within switch 120, it is presently preferred that storage device 148 is implemented in a manner (for example, distributed) so that the data stored on device 148 is accessible by other switches. It is contemplated that, while terminal agents 152 are always associated with the same terminal 132 connected to its respective switch 120, the subscriber agents 154 can be associated with one or more terminals 132 that are connected to different switches 120.

Figure 2:
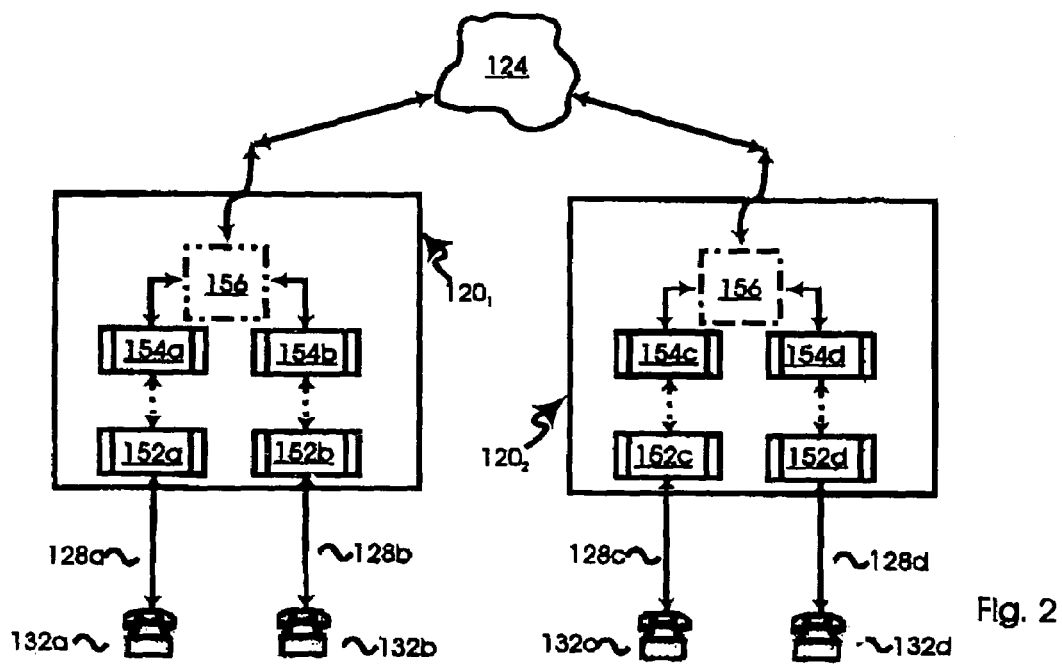
FIG. 2 is a schematic representation the software structure of two switches that are identical to the switch shown in FIG. 1.

While FIG. 1 shows switch 120 in terms of its hardware structure, in order to further explain the present embodiment it is useful to represent switch 120 in terms of its software structure, as shown in FIG. 2. Referring now to FIG. 2, two switches $120_1$ and $120_2$, identical to switch 120, are represented in terms of their software structure. Telephone lines 128*a* . . . 128*d* each connect to switch 120 through their respective terminal agent 152*a* . . . 152*d*.

In turn, each terminal agent 152*a*, 152*b*, 152*c*, and 152*d* is shown interconnected by a dotted-line to subscriber agents 154*a*, 154*b*, 154*c* and 154*d* respectively. This interconnection by the dotted line represents that the terminal-identifiers within subscriber agents 154*a*, 154*b*, 154*c* and 154*d* each point to terminal agents 152*a*, 152*b*, 152*c* and 152*d*, respectively.

Accordingly, an incoming call to the telephone number for subscriber agent 154*a* from network 124 will be directed to switch $120_1$, and to subscriber agent 154*a*. In turn, the terminal-identifier within subscriber agent 154*a* will point to terminal agent 152*a*, thus directing the incoming call to line 128*a* and cause telephone terminal 132*a* to ring.

Similarly, when an outgoing call is placed from terminal 132*a*, switch $120_1$ identifies that the call is being made though terminal agent 152*a*, and is being made by the subscriber associated with subscriber agent 154*a* and thus, typically, billing for the call is charged to the subscriber associated with subscriber agent 154*a*, and the set of calling features (i.e. call-waiting, caller-id etc.) belonging to that same subscriber are made available to that subscriber.

It will now be understood that the present embodiment shown in FIG. 2 behaves, in its current arrangement and from the perspective of subscribers, substantially the same as a prior art telephone central-office switch. However, in contrast to the prior art, the embodiment shown in FIG. 2 can be dynamically configured to different arrangements to provide novel behaviors. More specifically, the terminal-identifier of any subscriber agent 154*a*, 154*b*, 154*c* or 154*d* can be changed to point to one or more of terminal agents 152*a*, 152*b*, 152*c* or 152*d*.

Figure 3:
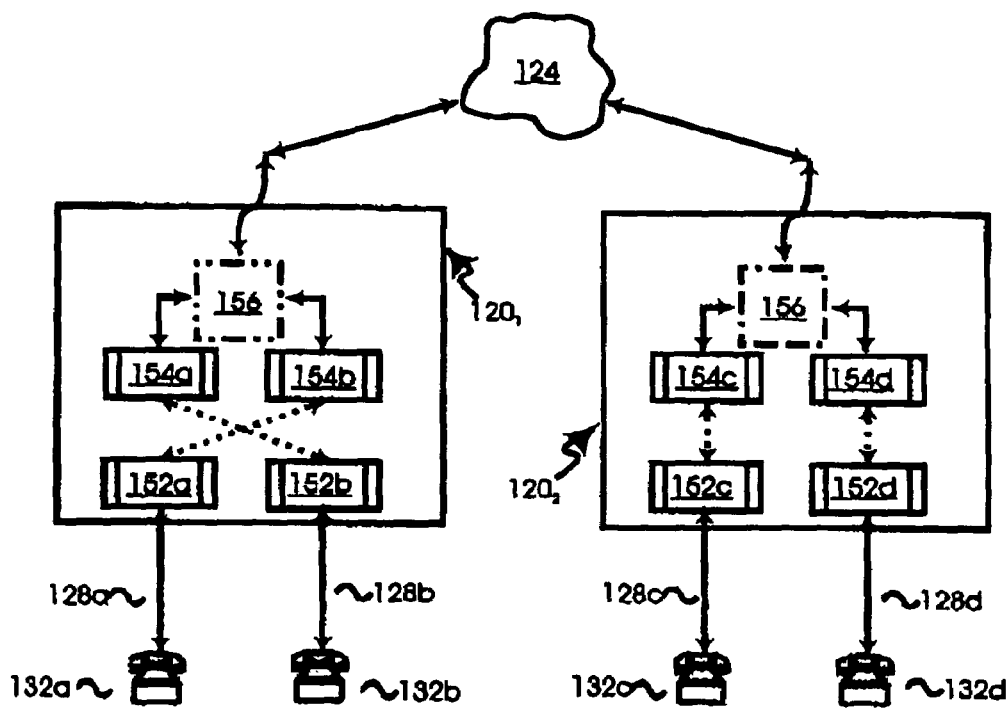
FIG. 3 is a schematic representation of the software structure of FIG. 2 wherein the subscriber agents are associated with different terminal agents.

For example, FIG. 3 shows the switches 120 of FIG. 2, but wherein the terminal-identifier of subscriber agent 154*a* has been changed to point to terminal agent 152*b*, and the terminal-identifier of subscriber agent 154*b* has been changed to point to terminal agent 152*a*. Thus, incoming calls to the telephone number associated with subscriber agent 154*a* are now directed to telephone line 128*b*, and incoming calls to telephone number associated with subscriber agent 152*a* are now directed to telephone line 128*a*. Similarly, the entire set of calling features associated with each of these subscriber agents 154*a* and 154*b* are now available for telephone lines 128*b* and 128*a*, respectively.

Figure 4:
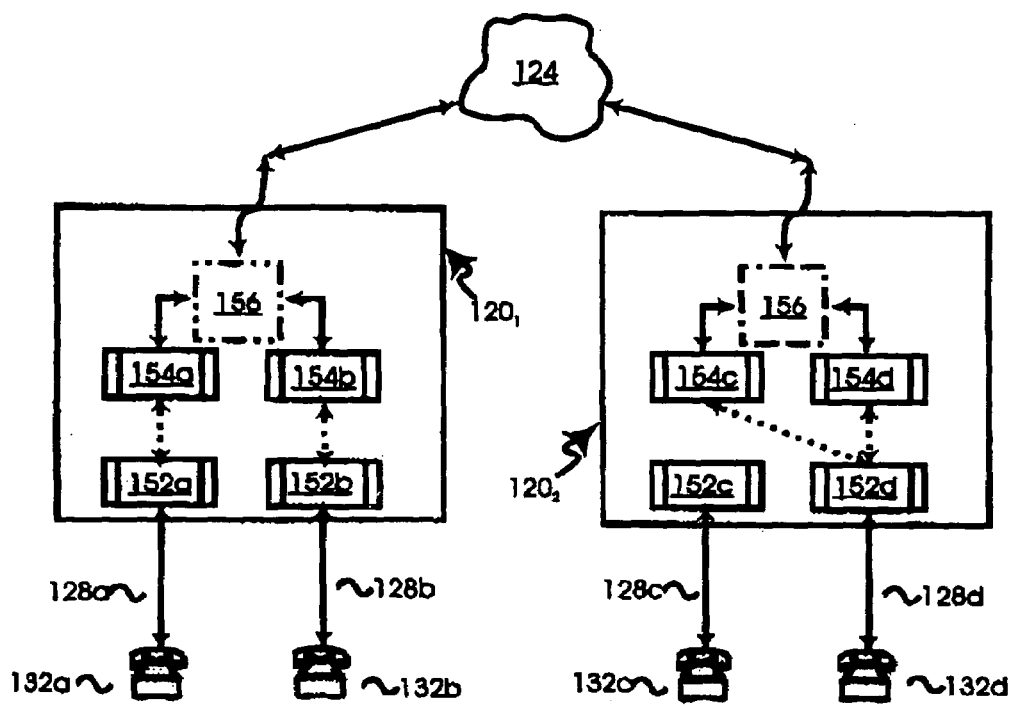
FIG. 4 is a schematic representation of the software structure of FIG. 2 wherein a subscriber agent is associated with a different terminal agent.

It will also be apparent that call-forwarding from one terminal 132 to another terminal 132 can be achieved simply by temporarily changing the terminal-identifier within a particular subscriber agent 154. For example, FIG. 4 shows switches 120 of FIG. 2, wherein the terminal-identifier of subscriber agent 154*c* has been changed to point to terminal agent 152*d*. Thus, incoming calls for the telephone number associated with subscriber agent 154*c* are now directed to telephone line 128*d*. Once the subscriber that owns subscriber agent 154*c* 'forwards' his phone from terminal agent 152*c* to terminal agent 152*d*, the subscriber can be physically present near terminal 132*d* and be able to receive all incoming calls and access all of the same calling features as if this subscriber was at terminal 132*c*.

It should also be noted that, according to the configuration in FIG. 4 subscriber agents 154*c* and 154*d* are both pointing to the same terminal agent 152*d*. According to this configuration, it can be desired to have subscriber agents 154*c* and 154*d* identify themselves to terminal agent 152*d* so that terminal agent 152*d* can use distinctive rings at terminal 132*d* to distinguish incoming calls for either subscriber agent 154*c* or 154*d*. Alternatively, if terminal 132*d* is equipped with a graphical display, then a message can be displayed thereon indicating which subscriber is receiving the incoming call.

Figure 5:
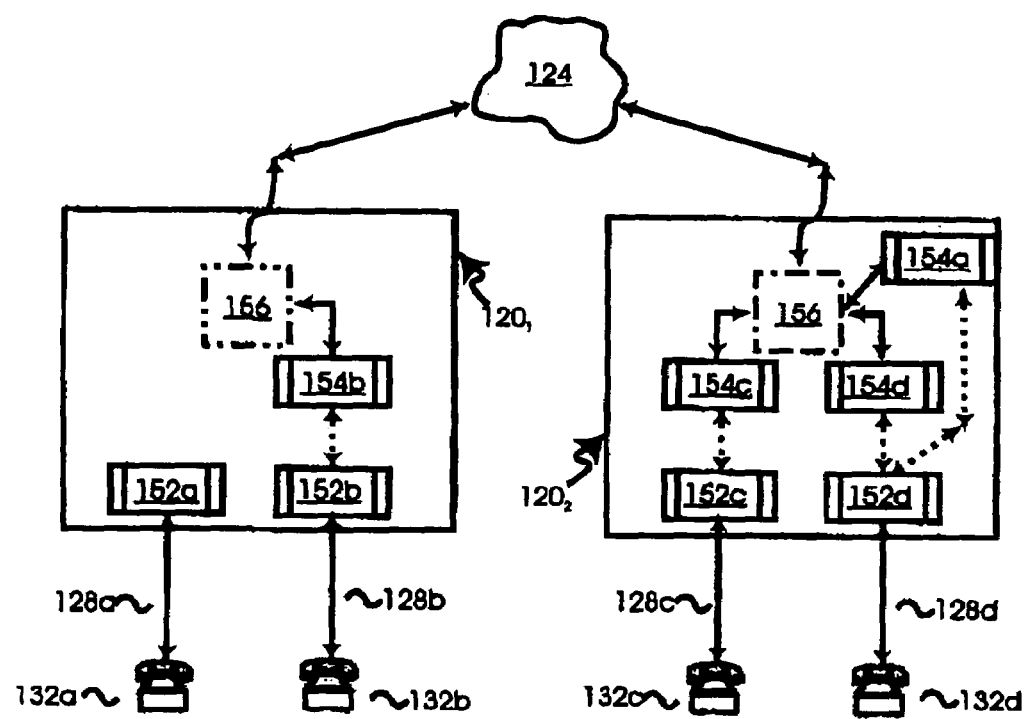
FIG. 5 is a schematic representation of the software structure of FIG. 2 wherein a subscriber agent is associated with a different terminal agent.

It is also to be understood that, due to the distributed nature of storage device 148, subscriber agents 154 can be instantiated in different switches 120 according to the identified terminal agent 152 within the terminal-identifier of the subscriber agent 154. For example, as shown in FIG. 5 user agent 154*a* is shown as being instantiated in switch $120_2$, and pointing to terminal agent 152*d*.

Figure 6:
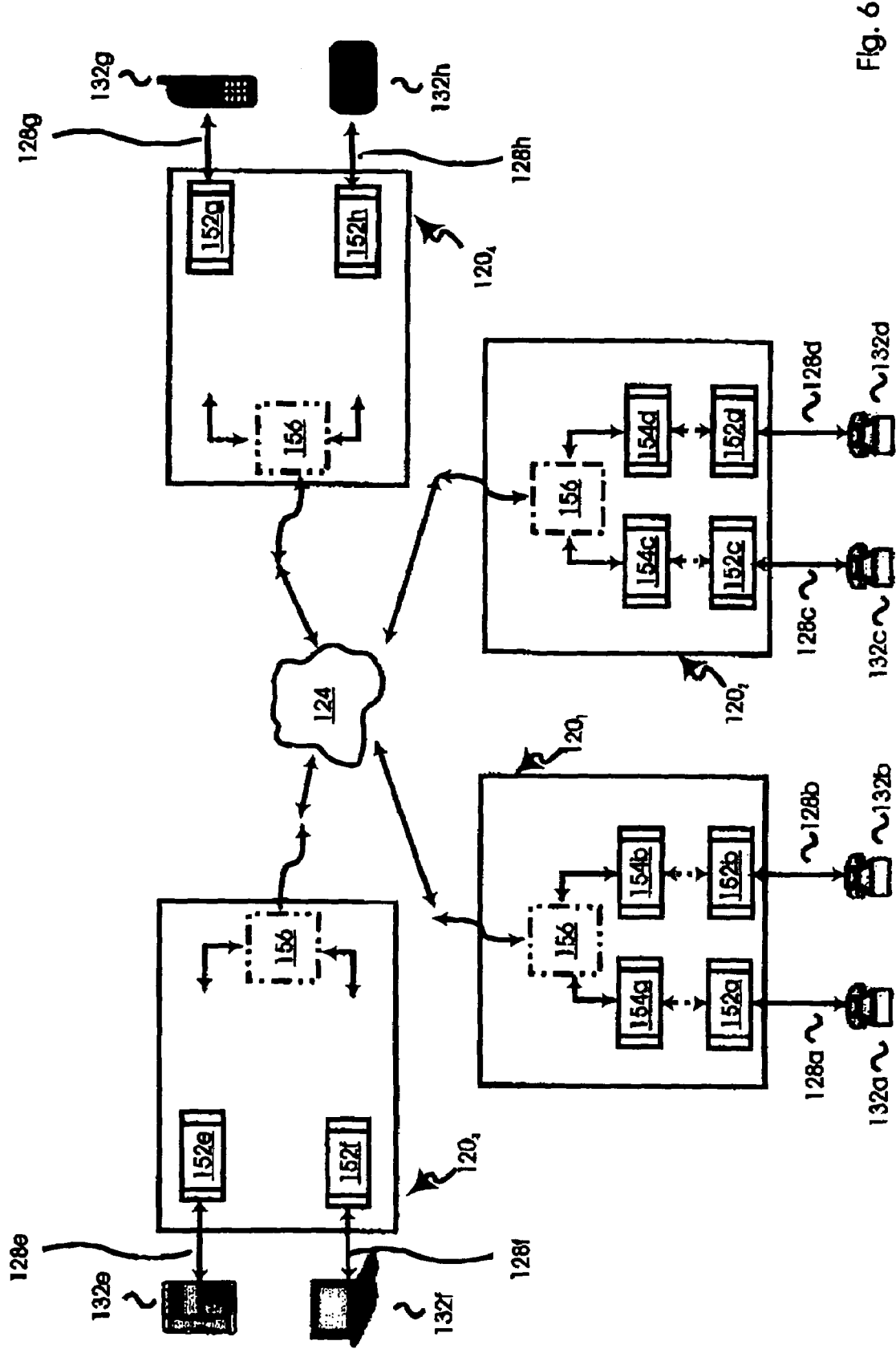
FIG. 6 is a schematic representation of a software structure in accordance with another embodiment of the invention.

Another embodiment of the invention is shown in FIG. 6, wherein four switches $120_1$, $120_2$ . . . $120_4$ are each interconnected by network 124. Switches $120_1$, $120_2$ in FIG. 6 are the same as switches $120_1$, $120_2$ in FIGS. 1–5. However, in contrast to the embodiment shown in FIGS. 1–5, the embodiment of FIG. 6 includes two additional switches $120_3$, and $120_4$, each of which have different terminal agents 152 and corresponding terminals 132 than switches $120_1$, $120_2$. Furthermore, as shown in FIG. 6 additional switches $120_3$, and $120_4$, do not include any subscriber agents 154, but switches $120_3$, and $120_4$ are operable to instantiate appropriate subscriber agents 154 that have terminal-identifiers which point to their terminal agents 152.

Switch $120_3$ connects, via terminal agent 152*e*, to a rich-featured telephone terminal 132*e* via a copper twisted-pair link 128*e*. Switch $120_3$ also connects via terminal agent 152*f*, to a lap-top computer terminal 132*f* via an Ethernet link 128*f* or the like. Terminal agents 152*e* and 152*f* are configured to interact with their respective terminals 132 based on the functionality of those terminals 132. For example, rich-featured telephone terminal 132*e* includes a graphic display and accordingly, terminal agent 152*e* is configured to pass caller-id streams to that graphic display if a subscriber agent 154 subscribes to caller-id. Similarly, lap-top computer terminal 132*f* includes a speaker and a microphone and accordingly, terminal agent 152*f* includes protocols and software to convert voice traffic into a data format that can be carried over Ethernet link 128*f* and utilized by lap-top computer 132*f* to conduct a voice telephone call over network 124. Caller-id streams sent to computer terminal 132*f* can then be used for a variety of enhanced features on terminal 132*f*, such as showing a photograph of the incoming-caller on the display of terminal 132*f* in addition to or in lieu of simply showing the incoming caller's name and number.

Switch $120_4$ connects, via terminal agent 152*g*, to a mobile telephone terminal 132*g* via a wireless link 128*g*. Switch $120_3$ also connects via terminal agent 152*h*, to a pager terminal $132_h$ via a wireless link 128*h*. Terminal agents 152*g* and 152*h* are configured to interact with their respective terminals 132 based on the functionality of those terminals 132. For example, mobile telephone terminal 132*g* includes a graphic display and accordingly, terminal agent 152*g* is configured to pass short messaging service (SMS) data streams to that graphic display if a subscriber agent 154 so subscribes. Similarly, pager terminal 132*h* only includes a graphic display and a beeper, and accordingly, terminal agent 152*f* includes software to present an interactive voice response (IVR) system to an incoming voice caller for a subscriber agent attached to terminal agent 152*f*. The IVR system prompts the incoming caller to leave a numeric message that can be displayed on pager terminal 132*h*, but blocks the incoming voice call connection.

An example of how the embodiment of FIG. 6 can operate will now be discussed. For purposes of the explanation, it will be assumed that the subscriber associated with subscriber agent 154*a* is named "Bill" who has the telephone number 555-555-5555. In addition, Bill subscribes to caller-id. Accordingly, subscriber agent 154*a* includes Bill's name, his phone number and the fact that he subscribes to caller-id and all other information associated with Bill's services.

It will also be assumed that Bill's home-telephone is telephone terminal 132*a*, which is located in Bill's home premises. It will be further assumed that, as shown in FIG. 6, the terminal-identifier of Bill's subscriber agent 154*a* is currently pointing to terminal agent 152*a*, and thus, any incoming calls for Bill will ring at terminal 132*a* in Bill's home.

Finally, it will be assumed that terminals 132*e*, 132*f*, 132*g* and 132*h* also all belong to Bill, namely: terminal 132*e* is Bill's office telephone, terminal 132*f* is Bill's work computer, terminal 132*g* is Bill's mobile telephone, and terminal 132*h* is Bill's pager.

Figure 7:
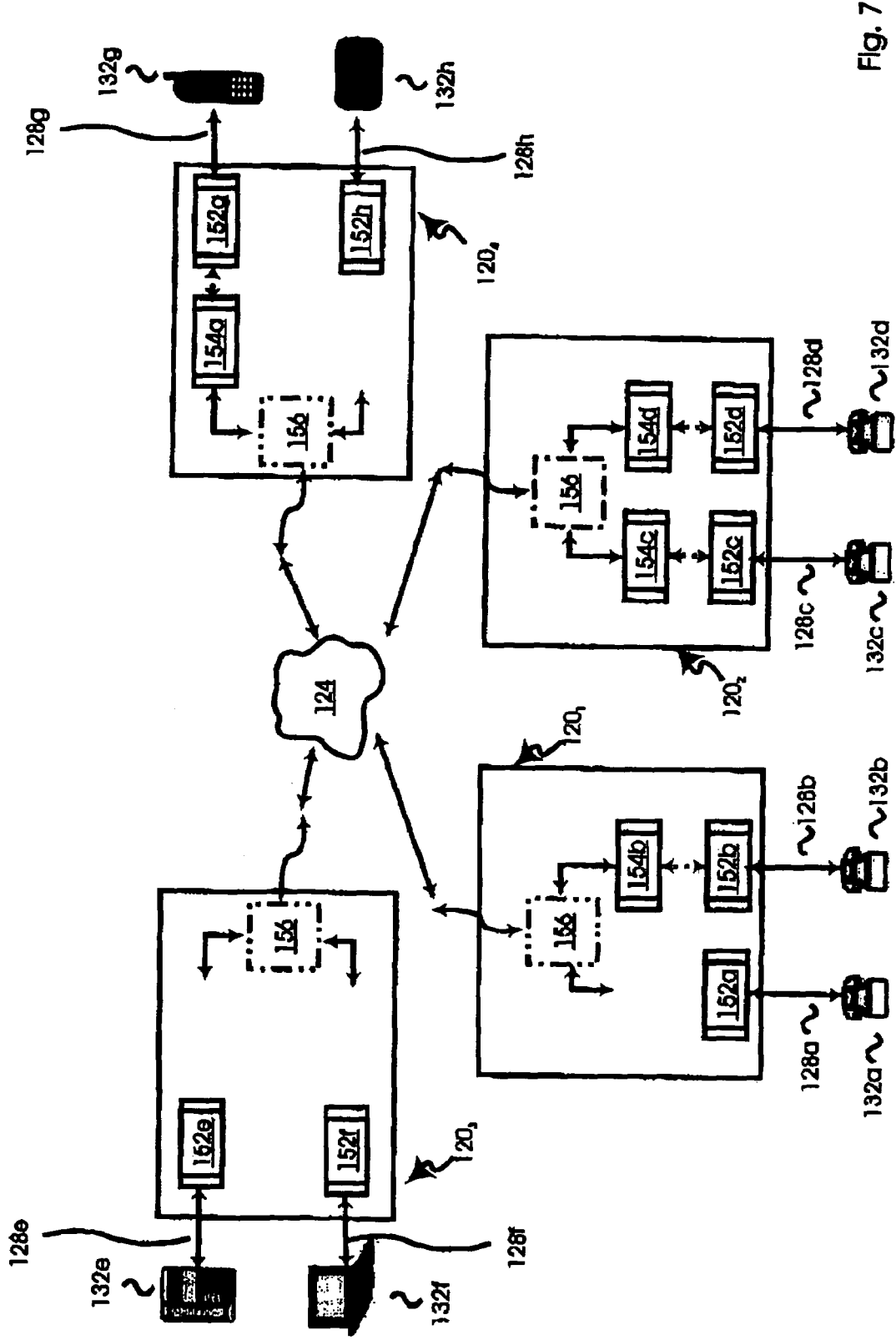
FIG. 7 is a schematic representation of the software structure of FIG. 6 wherein a subscriber agent is associated with a different terminal agent.

The exemplary explanation of operation of the embodiment continues with reference to FIG. 7, where Bill's subscriber agent 154*a* is shown pointing to terminal agent 152*g*, thus directing Bill's incoming calls and Bill's set of calling features, to mobile telephone terminal 132*g*. Bill can use any suitable means to redirect his subscriber agent 154*a* from terminal agent 152*a* to terminal agent 152*g*, such as by using an IVR menu system from telephone terminal 132*a* that directs subscriber agent 154*a* to change its terminal-identifier from terminal agent 152*a* to terminal agent 152*g*, or using a web-browser interface (from any internet-ready device) that gives Bill the ability to access his subscriber agent 154*a*. Accordingly, a caller dialing Bill's number "555-555-5555" will now be able to reach Bill at his mobile telephone terminal 132*g*. Similarly, the incoming caller's telephone number will be displayed on mobile telephone terminal 132*g*, because Bill's subscriber agent 154*a* indicates that Bill is a subscriber to the caller-id calling feature.

Figure 8:
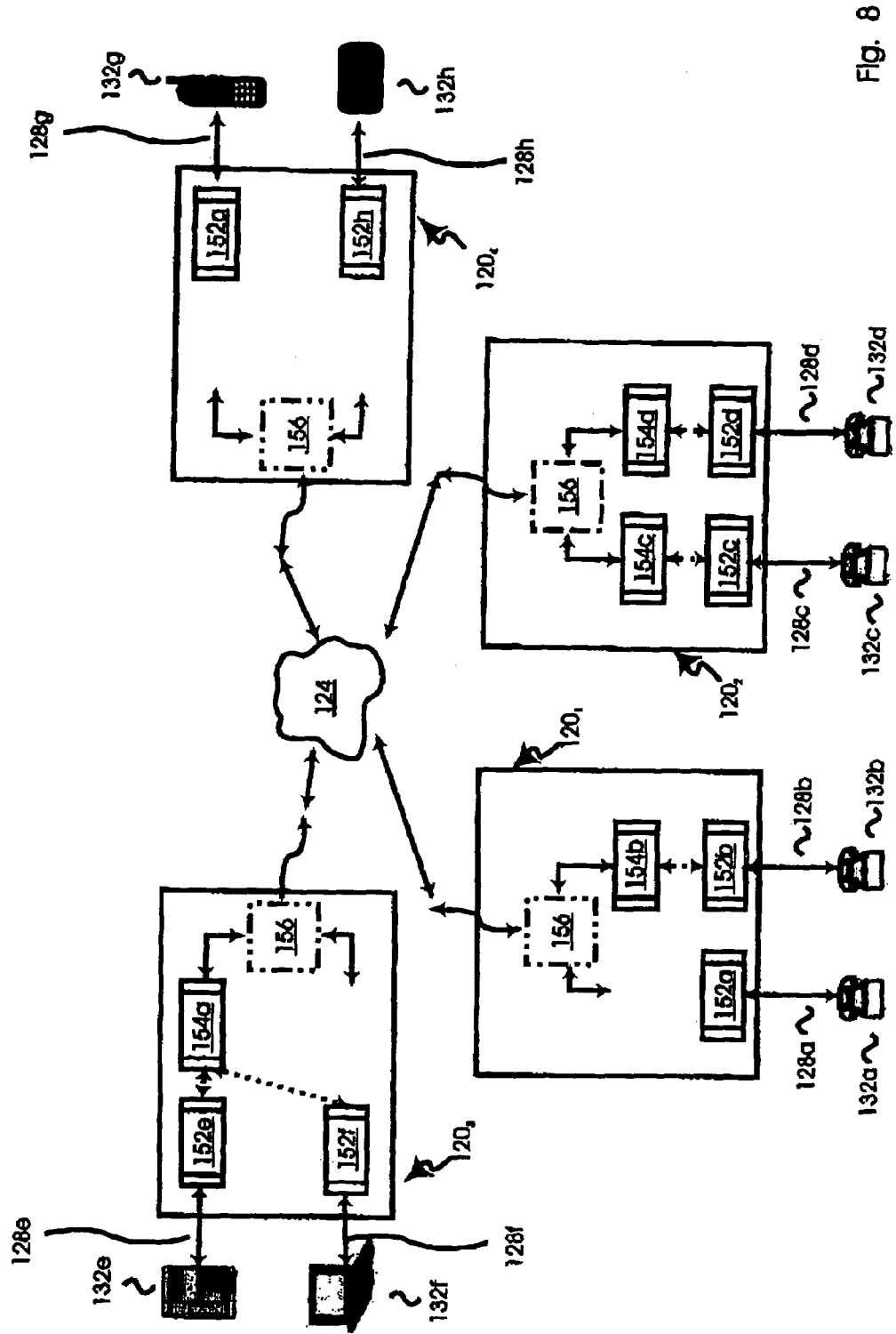
FIG. 8 is a schematic representation of the software structure of FIG. 6 wherein a subscriber agent is associated with different terminal agents.

The exemplary explanation of operation of the embodiment continues with reference to FIG. 8, where Bill's subscriber agent 154*a* is shown pointing to terminal agents 152*e* and 152*f*, thus directing Bill's incoming calls, and carrying Bill's set of calling features to terminals 132*e* and 132*f*. Again, Bill can use any suitable means to redirect his terminal agent 154*a* from terminal agent 152*g* to terminal agents 152*e* and 152*f*, such as by using an IVR menu system from telephone terminal 132*g*, or alternatively, by using a verification-procedure at either terminal 132*e* or 132*f*, such as typing a user-id and password into computer terminal 132*f*, which effectively logs Bill into switch $120_3$ and instantiates subscriber agent 154*a* therein. Accordingly, a caller dialing Bill's number "555-555-5555" will now be able to reach Bill at either rich-featured telephone terminal 132*e*, or at lap-top computer terminal 132*f*, giving Bill the option of a private call using terminal 132*e*, or a hands-free call using terminal 132*f*. Similarly, the incoming caller's telephone number will be displayed on terminal 132*e* and 132*f* because Bill's subscriber agent 154*a* indicates that Bill is a subscriber to the caller-id calling feature.

It is contemplated that the various rules, verification procedures, terminal-pointers, and other behaviours of subscriber agent 154*a* can be programmable by a service provider and/or the subscriber using any suitable input-device. For example, using the arrangement shown in FIG. 8, it is contemplated that Bill can access a user-interface on laptop computer terminal 132*f* to program the various rules, verification procedures, terminal-pointers, and other behaviours of subscriber agent 154*a*. Any desired type of behaviour criteria can be programmed. For example, subscriber agent 154*a* can be programmed to point to different terminal agents 152 depending on a number of criteria, such as the time of day, or the power-on state of different terminals 132. For instance, subscriber agent 154*a* can be programmed to point to terminal agent 152*g* any time that mobile telephone terminal 132*g* is turned 'on' and identifies itself to terminal agent 152*g*. Alternatively, or in addition, subscriber agent 154*a* can be programmed to:

1) point to terminal agent 152*a* (i.e. Bill's home telephone) from 6:00 PM–8:00 AM;
2) point to terminal agent 152*g* (i.e. Bill's mobile telephone) from 8:00 AM–9:00 AM and 5:00 PM–6:00 PM; and
3) point to terminal agents 152*e* and 152*f* (i.e. Bill's office phone and office computer) from 9:00 AM–5:00 PM.

Other criteria for pointing subscriber agent 154*a* to different terminal agents 152 will occur to those of skill in the art and are within the scope of the invention. For example, subscriber agent 154*a* can be programmed to hunt for its subscriber, Bill, at different terminal agents 152 if Bill does not answer, or if the terminal 132 associated with the terminal agent 152 is turned-off, finally pointing subscriber agent 154 to pager terminal 132*h* in the event that Bill does not answer any other terminal.

Another type of criteria for pointing subscriber agent 154*a* to different terminal agents 152 includes setting up rules based on caller-id information. For example, incoming telephone numbers with numbers associated with Bill's personal calls can be directed to Bill's home at telephone terminal 132*a*, while incoming telephone numbers with numbers associated with Bill's work calls can be directed to Bill's office at rich-featured telephone terminals 132*e*.

Figure 9:
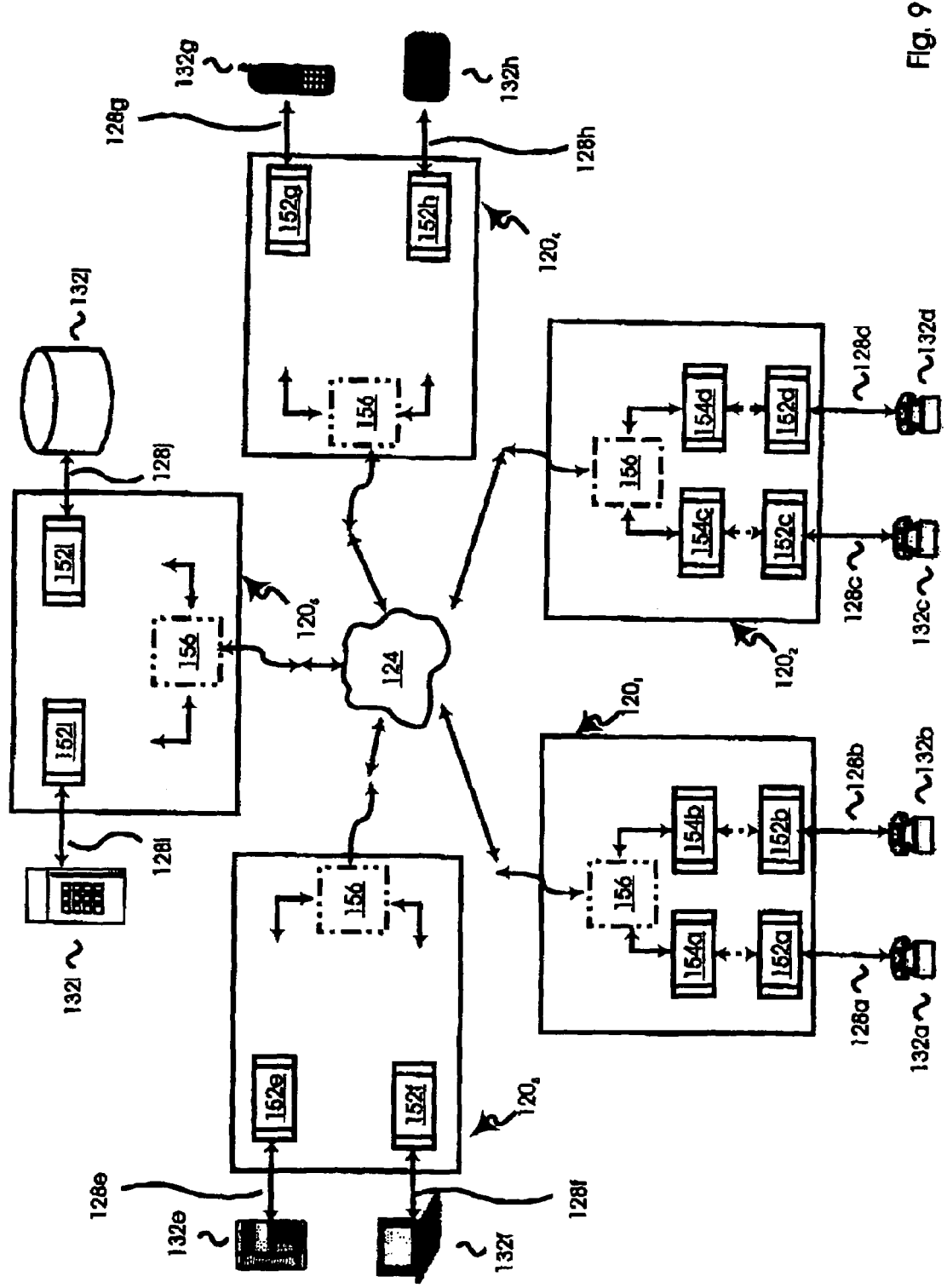
FIG. 9 is a schematic representation of a software structure in accordance with another embodiment of the invention.

In another embodiment of the invention, additional types of terminal agents 152 and terminals 132 are supported. Referring now to FIG. 9 switches $120_1 \ldots 120_4$ are the same as switches $120_1 \ldots 120_4$ in the embodiment shown in FIGS. 6–8. However, the embodiment of FIG. 9 includes an additional switch $120_5$ that connects, via terminal agent 152*i*, to a point-of-purchase terminal 132*g* via any suitable wired link 128*g*. Switch $120_5$ also connects via terminal agent 152*j*, to a voicemail-server terminal 132*j* via any suitable wired link 132*j*. Terminal agents 152*i* and 152*j* are configured to interact with their respective terminals 132 based on the functionality of those terminals 132. For example, point-of-purchase terminal 132*g* includes a card-reader, a keyboard and a graphic display and accordingly, terminal agent 152*i* is configured to receive financial purchase information, including the purchase price and bank-card or credit-card information, and subscriber verification information, of a subscriber from point-of-purchase terminal 132*i*. Terminal agent 152*i* is also configured to send authorization messages to point-of-purchase terminal 132*i*. Overall, it is to be understood that point-of-purchase terminal 132*i* functions, from the perspective of the merchant and the purchaser, substantially the same as prior art point-of-purchase terminals, but that point-of-purchase terminal 132*i* interacts with network 124 via terminal agent 152*i* and thus, from the perspective of network 124, performs authorizations in a different manner than the prior art, the details of which will be discussed in greater detail below.

Similarly, voicemail-server terminal 132*j* includes a processing unit and storage device to play outgoing voicemail messages to subscribers. Thus, voicemail-server terminal 132*j* performs the same functions as known voicemail systems, but, as will be explained in greater detail below, interacts with network 124 via terminal agent 152*j* and one or more subscriber agents 154

An example of how the embodiment of FIG. 9 can operate will now be discussed. For purposes of the explanation, it will be assumed that the subscriber associated with subscriber agent 154*a* is the same "Bill" as discussed in the example used to illustrate the embodiment shown in FIGS. 6–8. Accordingly, subscriber agent 154*a* includes Bill's name, his phone number and the fact that he subscribes to caller-id. In addition, subscriber agent 154*a* includes Bill's bank-card number, and includes the banking information associated with that number, such as the name of Bill's bank, Bill's bank account number, and the necessary protocols to seek debit authorizations from Bill's bank account.

Figure 10:
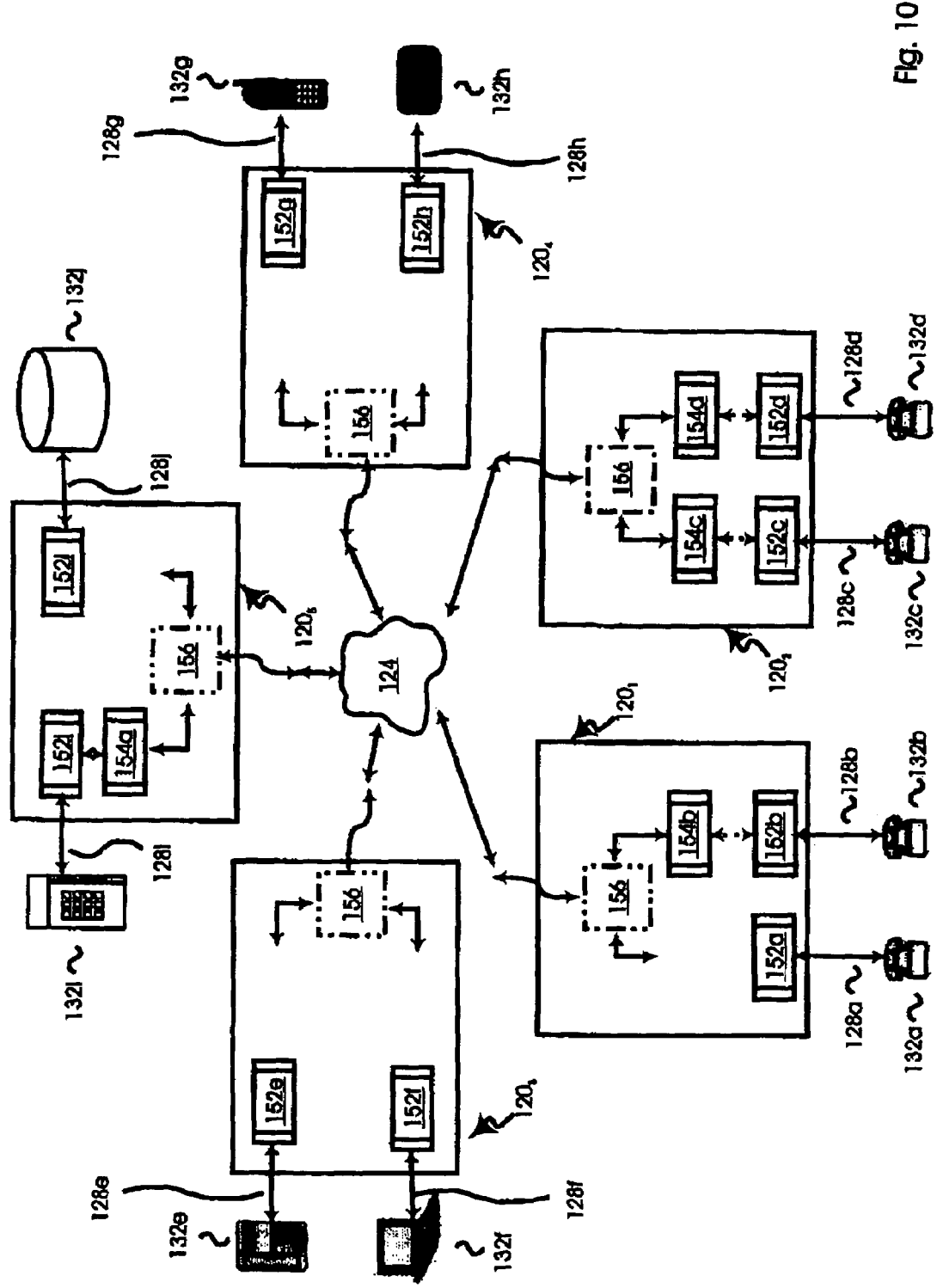
FIG. 10 is a schematic representation of the software structure of FIG. 9 wherein a subscriber agent is associated with a different terminal agent.

Continuing with explanation of exemplary operation of the embodiment, it is assumed that Bill has swiped his bank card through the card-reader at point-of-purchase terminal 132*i*. Bill's bank-card information is then sent to terminal agent 152*i*, causing Bill's subscriber agent 154*a* to be instantiated in switch $120_5$, as shown in FIG. 10. At this point, subscriber agent 154*a* uses appropriate verification procedures, (such as a personal identification number (PIN) entered into terminal agent 152*i* by Bill, and then authenticated by Bill's subscriber agent 154*a*,) and then utilizes Bill's banking information stored in subscriber agent 154*a* to seek appropriate purchase authorization from Bill's bank, by accessing Bill's bank through network 124.

It should now be apparent that Bill's subscriber agent 154*a* can also be pointed to the terminal-identifier associated with terminal agent 152*j*, thus directing Bill's incoming voice calls to voicemail server terminal 132*j*. Again various criteria can be used to determined where the terminal-identifier in Bill's subscriber agent 154*a* will point.

An example of how voicemail-terminal agent 152*j* can operate will now be discussed with reference to FIG. 11. For purposes of the explanation, it will be assumed that the subscriber associated with subscriber agent 154*a* is the same "Bill" as discussed in the example used to illustrate the embodiment shown in FIGS. 9–10. Accordingly, subscriber agent 154*a* includes Bill's name, his phone number and the fact that he subscribes to caller-id.

In addition, it will be assumed that the subscriber associated with subscriber agent 154*b* is named "Hillary" who has the telephone number 666-666-6666. Accordingly, subscriber agent 154*b* includes Hillary's name and her phone number. In addition, it will be assumed that the subscriber associated with subscriber agent 154*d* is named "Monica" who has the telephone number 777-777-7777. Accordingly, subscriber agent 154*d* includes Monica's name and her phone number. Tables I–III provide a summary of subscriber agent 154*a*, 154*b*, and 154*d* and the criteria associated therewith.

TABLE I

Subscriber agent 154a
Bill

| | |
|---|---|
| Name | Bill |
| Telephone number | 555-555-5555 |
| Caller-id | Yes |
| Default terminal-identifier | Terminal agent 152a ("Bill's home") |
| First behavior criteria | If incoming call is from "Monica" then point terminal-identifier to terminal agent 152h. ("Bill's pager") |
| Second behavior criteria | If no response at terminal agent 152a or terminal agent 152g, then point terminal-identifier to voicemail terminal agent 152j. ("Bill's voicemail") |

TABLE II

Subscriber agent 154b
Hillary

| | |
|---|---|
| Name | Hillary |
| Telephone number | 666-666-6666 |
| Default terminal-identifier | Terminal agent 152b ("Hillary's home") |

TABLE III

Subscriber agent 154d
Monica

| | |
|---|---|
| Name | Monica |
| Telephone number | 777-777-7777 |
| Default terminal-identifier | Terminal agent 152d ("Monica's home") |

Referring again to FIG. 9, subscriber agent 154*a* is shown pointing to terminal agents 152*a*, 152*j* and 152*h*, which are Bill's home, voicemail and pager, respectively. The various terminal agents 152 to which subscriber agent 154 points in FIG. 9 are thus representative of the criteria described in Table I.

Figure 11:
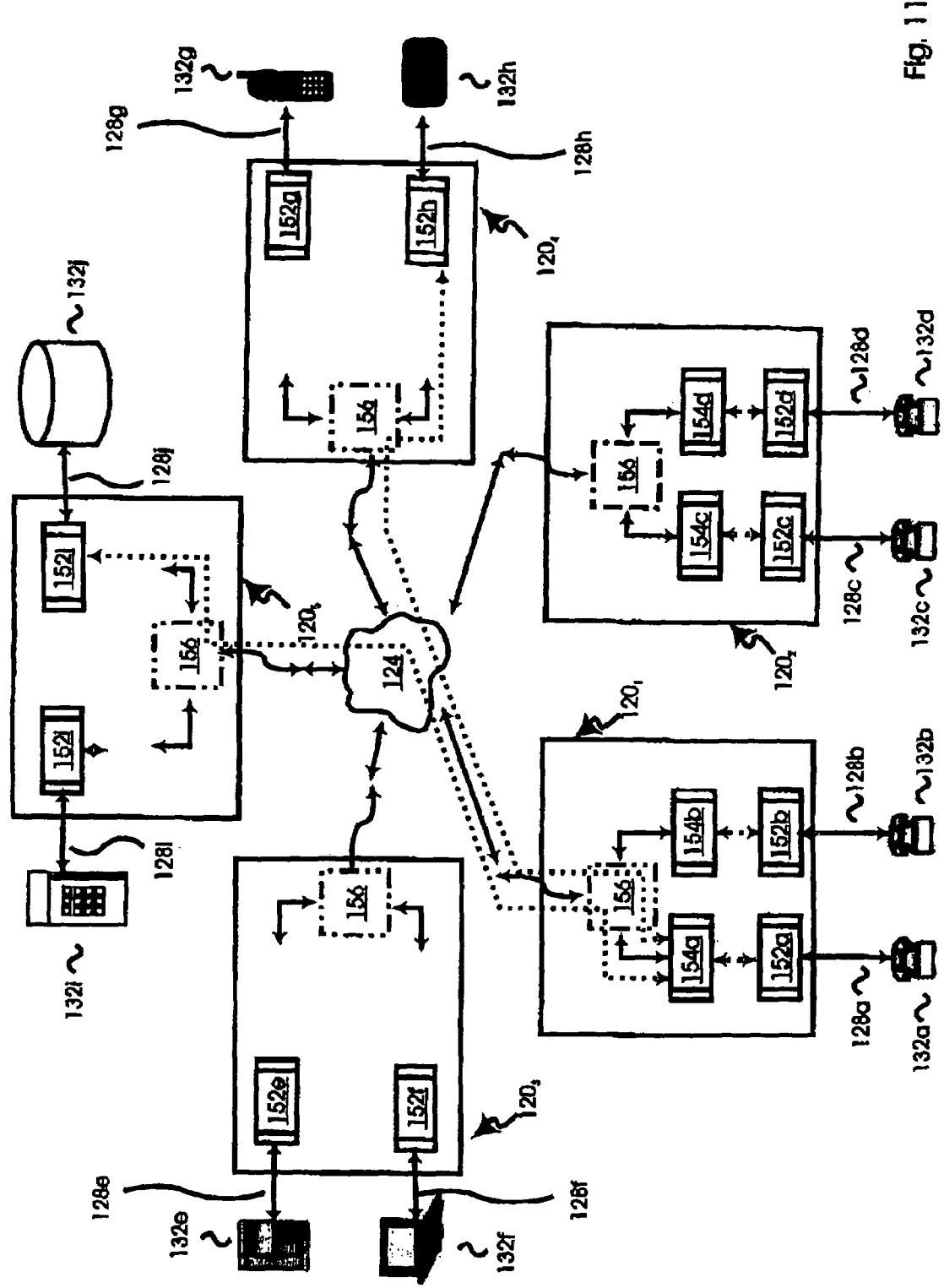
FIG. 11 is a schematic representation of the software structure of FIG. 9 wherein a subscriber agent is associated with terminal agents according to different behaviour criteria.

Continuing now with explanation of the exemplary operation of the embodiment in FIG. 11, it will be assumed that Monica wishes to call Bill. Accordingly, Monica uses her telephone terminal 132*d* causing the corresponding terminal agent 152*d* to notify Monica's subscriber agent 154*d* that Monica is placing a call. Monica then dials Bill's phone number, 555-555-5555, into her terminal 132*d*. Next, Monica's subscriber agent 154*d* accesses network 124 and locates Bill's subscriber agent 154*a*. Monica's subscriber agent 154*d* identifies itself to Bill's subscriber agent 154*a* and indicates that Monica is trying to contact Bill. During this stage of the call setup between Monica and Bill, subscriber agents 154*d* and 154*a* can negotiate certain parameters for the call, by exchanging information about each of the subscriber agents, such as: which party (Monica or Bill) will pay for the call; the type of voice coder used for the call; whether the call is to be encrypted; whether Monica is calling from a terminal 132 that supports voice-only or whether it supports voice and video; or any other terms or parameters that may be desired in setting up a call between Monica and Bill. As part of this negotiation, subscriber agent 154*a* will check its behaviour criteria, as shown in Table I, and, upon determining that the call originates from Monica, subscriber agent 154*a* will route Monica's call to Bill's pager terminal 132*h*. Accordingly, as part of the negotiation, terminal agent 152*h* will notify Bill's subscriber agent 154*a*, that terminal 152*h* is unable to accept Monica's incoming voice call, and will instead present the IVR menu system that notifies Monica that Bill is unavailable but that she can leave a message for display on Bill's pager terminal 132*h*. At this stage in the call Monica can either leave the message or simply terminate the call, thus terminating the interaction between her subscriber agent 154*d* and Bill's subscriber agent 154*a*. In addition, Bill's subscriber agent 154*d* can display a message on Bill's pager terminal 132*h* indicating that Monica attempted to call Bill and include the time and date of Monica's attempted call.

The embodiment in FIG. 9 can operate in other ways. For example, assume that Hillary is trying to phone Bill. Accordingly, Hillary uses her telephone terminal 132*b*, and terminal agent 152*b* notifies Hillary's subscriber agent 154*b* that Hillary is placing a call. Hillary then enters Bill's phone number, 555-555-5555 into her terminal 132*b*. Next, Hillary's subscriber agent 154*d* locates Bill's subscriber agent 154*a*. Hillary's subscriber agent 154*b* identifies itself to Bill's subscriber agent 154*a* and indicates that Hillary is trying to contact Bill. During this stage of the call setup between Hillary and Bill, subscriber agents 154*b* and 154*a* can negotiate certain parameters for the call, by exchanging information about each of the subscriber agents. As part of this negotiation, subscriber agent 154*a* checks its behaviour criteria, as shown in Table I, and, upon determining that no special behaviour criteria apply, the call is routed to Bill's home terminal 132*a*. Accordingly, Bill's telephone terminal 132*a* will start ringing. Assuming Bill does not answer, Bill's subscriber agent 154*a* will examine its behaviour criteria (listed in Table I) and, having determined Bill is not answering, subscriber agent 154*a* will reroute Hillary's call to voicemail terminal agent 152*j*, where Hillary will be given the opportunity to leave a voicemail.

While the embodiments discussed herein are directed to specific implementations of the invention, it will be understood that combinations, sub-sets and variations of the embodiments are within the scope of the invention. For example, the embodiments herein show only one instance of a subscriber agent appearing at a time, yet it can be desired to have multiple instances of the subscriber agent, each instance interacting synchronously with each other, in order to provide desired telecommunication access by a subscriber, such as setting up multiple calls at different terminal agents. However, it will also be understood that the system can be configured so that a particular subscriber agent need not instantiate itself within a particular switch in order to interact with a terminal agent within that same switch, but that the subscriber agent can be instantiated anywhere within the network and remotely interact with any terminal agent within any given switch.

It is also to be understood that a subscriber agent can be pointed to another subscriber agent instead of, or in addition to, pointing to a terminal agent. For example, where a subscriber agent belongs to a customer service representative (CSR) in a company, and that CSR is on vacation, then the vacationing CSR can point his/her terminal identifier to a colleague's subscriber agent, so that calls thereto are answered during the vacationing CSR's absence.

A person of skill in the art will now recognize that by simply changing the terminal-identifier within a subscriber agent, the present invention provides an implementation of the FCC mandated local-number portability requirement.

The present invention is intended to encompass a broad variety of subscriber agents. While the embodiments discussed herein discuss subscriber agents that belong to individual subscribers, it is contemplated that subscriber agents can be associated with groups of people or organizations. For example, a corporation can have a subscriber agent that, according to various behaviour criteria, will direct incoming calls to individual receptionists, or to an IVR system containing the corporate phone directions. Again, such subscriber agents can be configured with a broad variety of behaviour, such as answering incoming calls in different ways depending on the time of day or based on the incoming caller's caller-id stream.

Another type of group subscriber agent includes the operator. Thus, when a caller dials '0', the call will be directed to a subscriber agent within the system that is associated with the operator, which in turn can manage the incoming call in any desired way, such as directing the caller to a person who works in the capacity as an operator. Other types of group subscriber agents will occur to those of skill in the art, such as a technical assistance center (TAC) for a corporation.

It is contemplated that, if desired, individuals can have multiple subscriber agents that can be programmed to interact if desired. For instance an individual can have a 'work' subscriber agent and a 'personal' subscriber agent, each of which may direct incoming callers to different or identical terminal agents, according to the wishes of the individual subscriber.

It is to be understood that the present invention is not limited to the various types of terminals 132 specifically discussed in the previous embodiments; other types of terminals are within the scope of the invention, such as video-telephones that show picture images of each caller in addition to voice traffic, personal digital assistants, network-enabled appliances and the like.

It is to be understood that terminal agents can also be configured with different types of behaviour criteria that interact and/or negotiate with subscriber agents in order to establish the terms and types of calls. For example, a terminal agent can be configured to have one or more subscribers that own that particular terminal. Additionally, a terminal that belongs to a first subscriber, may be configured to restrict access to other subscribers. For example, the first subscriber may wish to limit telephone calls to five minutes. Thus, the first subscriber can configure his terminal agent to automatically cut-off calls that are placed by a second subscriber once the second subscriber has used the terminal for longer than five minutes. Another type of behaviour criteria can be to simply restrict which subscriber agents are actually allowed to point themselves at the terminal agent i.e. the subscriber that owns the subscriber agent may prevent all other subscriber agent's from pointing to his terminal agent. Other types of behaviour criteria for a particular terminal agent will occur to those of skill in the art.

It is to be understood that any suitable verification procedure can be used in order to point the terminal-identifier of a given subscriber agent 154 to a given terminal agent 152. For example, a switch 120 can include an IVR menu system that requires the subscriber to enter his telephone number and a corresponding PIN number can be used. Alternatively, or in addition, smart-card readers can be incorporated into terminals 132 which send a subscriber's smart-card contents to switch 120, which can associate the smart-card to the subscriber's subscriber agent. Other procedures, such as voice recognition, can also be suitable verification protocols, as will occur to those of skill in the art.

It is to be understood that the switches 120 discussed in the previous embodiments are scalable and can support any number of terminal agents 152 and/or user agents 154, as desired. It is also contemplated that smaller switches 120 can be implemented inside a subscriber premises, functioning as a private branch exchange (PBX) for a small business or a consumer household that require multiple subscriber agents and/or multiple telephones or and/or other types of terminals.

It is to be understood that the present invention can be used to implement all known calling features (i.e. call waiting, caller-id, call-forwarding, speed dialing etc.), and, in addition can be used to implement any additional calling features that may be operable, desirable or otherwise supportable on a given terminal and/or within a particular network.

While the embodiments discussed herein refer to terminal agents and subscriber agents, it is to be understood that other types of software structures, other than agents, are within the scope of the invention.

It is to be understood that the present invention can be incorporated into existing telecommunication networks, such as the PSTN, by including appropriate gateways. For example, subscriber agents can include functionality that allows it to recognize when a call is to be completed with a PSTN subscriber, and then mimic a prior art PSTN to make the subscriber agent behave transparently to the PSTN, thus allowing the completion of the call.

The present invention provides a novel telecommunication architecture. The architecture includes a subscriber agent for each subscriber within a telecommunication network. The subscriber agent includes the subscriber's telephone number and calling features. The subscriber agent can be associated with one or more terminal agents within the network, so that the subscriber's telephone number and complete set of calling features can be carried to any terminal within the network. A wide variety of calling features and terminals are supported by the architecture. For example, unlike the prior art a subscriber can invoke a personal set of calling features from any terminal within the network. In addition, local number portability is readily achieved with the present invention. Other advantages will occur to those of skill in the art.

The above-described embodiments of the invention are intended to be examples of the present invention and alterations and modifications may be effected thereto, by those of skill in the art, without departing from the scope of the invention which is defined solely by the claims appended hereto.

We claim:

1. A telecommunication architecture comprising:
    a network for carrying subscribers' communications between terminals;
    a plurality of software terminal agents executing on said network, such that each terminal is associated, on a one-to-one basis, with a corresponding software terminal agent for managing communications with that terminal according to that terminal's capabilities; and
    a plurality of subscriber agents executing on said network, such that for each subscriber there is at least one uniquely associated subscriber agent, each said subscriber agent being configurable to point to at least one of said software terminal agents, such that a subscriber can establish a communication over said network from a terminal associated with a software terminal agent pointed to by that subscriber's subscriber agent.

2. The architecture according to claim 1, wherein said subscribers include an individual.

3. The architecture according to claim 1, wherein said subscribers include a subscriber which represents a group of persons.

4. The architecture according to claim 3, wherein said group includes corporation.

5. The architecture according to claim 3, wherein said group includes a technical assistance center.

6. The architecture according to claim 3 wherein said group includes a collection of network operators.

7. The architecture according to claim 3 wherein said group includes a '911'call center.

8. The architecture according to claim 1, wherein said subscriber agent is identifiable by said associated subscriber's telephone number.

9. The architecture according to claim 1, wherein at least one software terminal agent may be configured to restrict at least one of: (1) use of its associated terminal; and (2) at least one subscriber agent from pointing to the at least one software terminal agent for the purpose of establishing a communication.

10. A switch for interconnecting a network and a plurality of terminals, the switch comprising:
    a plurality of subscriber line interfaces for connection to the terminals;
    a network interface for connection to the network; and
    a controller interconnecting said subscriber line interfaces and said network, said controller being operable to execute a plurality of software terminal agents and a plurality of subscriber agents, such that for each subscriber there is at least one uniquely associated subscriber agent, each said subscriber agent being configurable to point to at least one of said software terminal agents, each terminal, which is connected to a subscriber line interface, being associated, on a one-to-one basis, with a corresponding software terminal agent for managing communications with that terminal according to that terminal's capabilities and so that said switch may interconnect a network connected to said network interface with a terminal connected to one of said subscriber line interfaces so as to allow a subscriber whose subscriber agent points to the software terminal agent associated with that terminal to conduct a communication over the network from that terminal.

11. The switch according to claim 10 wherein said terminals include a telephone.

12. The switch according to claim 10 wherein said terminals include a rich-featured telephone having a graphical display.

13. The switch according to claim 10 wherein said terminals include a wireless telephone and said switch is a wireless base station.

14. The switch according to claim 10 wherein said terminals include a pager.

15. The switch according to claim 10 wherein said terminals include a personal digital assistant.

16. The switch according to claim 10 wherein said terminals include a voicemail server.

17. The switch according to claim 10 wherein said terminals include a point-of-purchase terminal.

18. The switch according to claim 10 wherein said network comprises the PSTN.

19. The switch according to claim 10 wherein said network comprises the Internet.

20. The switch according to claim 10 wherein each said subscriber agent includes said associated subscriber's name.

21. The switch according to claim 10 wherein each said subscriber agent includes a set of calling features belonging to said associated subscriber.

22. The switch according to claim 21 wherein said calling features are accessible by said subscriber at any terminal to which said associated subscriber agent points.

23. The switch according to claim 21 wherein said calling features include at least one of caller-id, call waiting, speed calling, call privacy, visual call waiting, and call privacy.

24. The switch according to claim 21 wherein said calling features include call forwarding, which is implemented by configuring said subscriber agent to point to a desired terminal agent.

25. The switch according to claim 10, wherein at least one software terminal agent may be configured to restrict at least one of: (1) use of its associated terminal; and (2) at least one subscriber agent from pointing to the at least one software terminal agent for the purpose of establishing a communication.

26. A computer-readable medium encoded with a software structure, the software structure being executable on a switch for interconnecting a network and a plurality of terminals, and the software structure comprising:
 a plurality of software terminal agents, such that each terminal is associated, on a one-to-one basis with a corresponding software terminal agent for managing communications with that terminal according to its capabilities; and,
 a plurality of subscriber agents, such that for each subscriber there is at least one uniquely associated subscriber agent, each said subscriber agent being configurable to point to at least one of said software terminal agents so that a subscriber can establish a communication over said network from a terminal associated with said software terminal agent pointed to by that subscriber's subscriber agent.

27. The medium according to claim 26 wherein said terminals include a telephone and wherein said communication is a voice telephone call.

28. The medium according to claim 26 wherein said terminals include a personal computer.

29. The medium according to claim 26 wherein said terminals include a wireless telephone and said switch is a wireless base station.

30. The medium according to claim 26 wherein said terminals include a pager and wherein said communication includes a paging message.

31. The medium according to claim 26 wherein said terminals include a personal digital assistant.

32. The medium according to claim 26 wherein said terminals include a voicemail server.

33. The medium according to claim 26 wherein said terminals include a point-of-purchase terminal and wherein said communication includes a purchase authorization.

34. The medium according to claim 26 wherein said network includes the PSTN and said switch includes a PSTN gateway.

35. The medium according to claim 26 wherein said network includes the Internet.

36. The medium according to claim 26 wherein each said subscriber agent includes said associated subscriber's name.

37. The medium according to claim 26 wherein each said subscriber agent includes a set of calling features belonging to said associated subscriber.

38. The medium according to claim 37 wherein said calling features are accessible by said subscriber at any terminal capable of supporting said features and to which said associated subscriber agent points.

39. The medium according to claim 37 wherein said calling features include at least one of caller-id, call waiting, speed calling, call privacy, visual call waiting, and call privacy.

40. The medium according to claim 37 wherein said calling features include call forwarding, which is implemented by pointing said subscriber agent to a desired terminal agent.

41. The medium according to claim 26, wherein at least one software terminal agent may be configured to restrict at least one of: (1) use of its associated terminal; and (2) at least one subscriber agent from pointing to the at least one software terminal agent for the purpose of establishing a communication.

42. A method for setting up an incoming call to a subscriber comprising the steps of:
 receiving a request to establish said call with said subscriber;
 selecting a software terminal agent uniquely associated with a single terminal for managing communications according to said terminal's capabilities and pointed to by a subscriber agent uniquely associated with said subscriber, each software terminal agent being associated, on a one-to-one basis, with a corresponding terminal, such selection based upon behaviour criteria with which said subscriber agent is programmed; and
 connecting said call to said terminal associated with said selected software terminal agent.

43. The method according to claim 42 further comprising the step of:
 providing calling features for said subscriber at said terminal in accordance with calling features listed in said associated subscriber agent.

44. The method according to claim 43 wherein said calling features include at least one of caller-id, call waiting, speed calling, call privacy, visual call waiting, and call privacy.

45. The method according to claim 43 wherein said calling features include call forwarding.

46. The method according to claim 42 wherein said terminals include a telephone.

47. The method according to claim 42 wherein said terminals include a personal computer.

48. The method according to claim 42 wherein said terminals include a wireless telephone.

49. The method according to claim 42 wherein said terminals include a pager.

50. The method according to claim 42 wherein said terminals include a personal digital assistant.

51. The method according to claim 42 wherein said terminals include a voicemail server.

52. The method according to claim 42 wherein each subscriber agent includes said associated subscriber's name.

53. The method according to claim 42 wherein said subscribers include a subscriber which represents a group of persons.

54. The method according to claim 42 wherein said step of receiving request to establish said call includes the step of providing said subscriber's telephone number.

55. The method according to claim 42, wherein at least one software terminal agent may be configured to restrict at least one of: (1) use of its associated terminal; and (2) at least one subscriber agent from pointing to the at least one software terminal agent for the purpose of establishing a communication.

56. A method of associating a subscriber with a terminal comprising the steps of:

receiving a request from a subscriber to be associated with a terminal;

determining, from an identification of the subscriber and from a single software terminal agent uniquely associated with the terminal, any restrictions on the use of the terminal by the identified subscriber, each software terminal agent being associated, on a one-to-one basis, with a corresponding terminal; and if the restrictions permit use of the terminal by the subscriber, then modifying a subscriber agent uniquely associated with the identified subscriber so that it points to the software terminal agent.

57. A method for setting up an outgoing call by a subscriber from a terminal comprising the steps of:

receiving a request to establish said call from said terminal;

identifying the call as being made through a software terminal agent that is a single software terminal agent uniquely associated with said terminal for managing communications according to that terminal's capabilities and that is pointed by a subscriber agent uniquely associated with said subscriber, each software terminal agent being associated, on a one-to-one basis, with a corresponding terminal; and connecting said call so as to provide calling features for the subscriber at the terminal in accordance subscriber's calling features included in said subscriber agent that are available at said terminal.

58. The method according to claim 57 wherein said terminal is a point-of-purchase terminal and wherein said communication includes a purchase authorization.

* * * * *